United States Patent

[11] 3,581,584

[72] Inventor Frederic Calland Williams
Prestbury, England
[21] Appl. No. 784,446
[22] Filed Dec. 17, 1968
[45] Patented June 1, 1971
[73] Assignee National Research Development Corporation
London, England
[32] Priority Jan. 8, 1968
[33] Great Britain
[31] 1100/68

[54] TORQUE CONVERTER
19 Claims, 10 Drawing Figs.
[52] U.S. Cl. ................................................. 74/64, 74/793
[51] Int. Cl. .............................................. F16h 33/02, F16h 3/74
[50] Field of Search .................................... 74/64, 752, 793, 394

[56] References Cited
UNITED STATES PATENTS

| | | | |
|---|---|---|---|
| 1,718,073 | 6/1929 | Reece et al. | 74/64 |
| 1,767,311 | 6/1930 | Rohrbacher | 74/64 |
| 1,798,723 | 3/1931 | Chalmers | 74/64 |
| 1,949,042 | 2/1934 | Dodge | 74/64 |
| 2,177,212 | 10/1939 | Evrell | 74/64X |
| 2,231,832 | 2/1941 | Pitts | 74/64 |
| 2,232,234 | 2/1941 | Hilliard | 74/64 |
| 2,248,444 | 7/1941 | Torok | 74/64 |
| 2,366,637 | 1/1945 | Mejean et al. | 74/64 |
| 2,430,089 | 11/1947 | Tipton | 74/752X |
| 2,453,577 | 11/1948 | Krispis | 74/752 |

FOREIGN PATENTS

| | | | |
|---|---|---|---|
| 152,966 | 12/1921 | Great Britain | 74/64 |

*Primary Examiner*—Carlton R. Croyle
*Assistant Examiner*—Thomas C. Perry
*Attorney*—Cushman, Darby & Cushman

ABSTRACT: The invention relates to a torque converter in which a prime mover such as an internal combustion engine, producing rotary movement, is arranged to produce oscillating torque which is then applied via a one-way clutch and a spring to a lost motion device in turn connected to the load. The arrangement is such that the combination of the clutch and spring transfers movement in one direction only to the load.

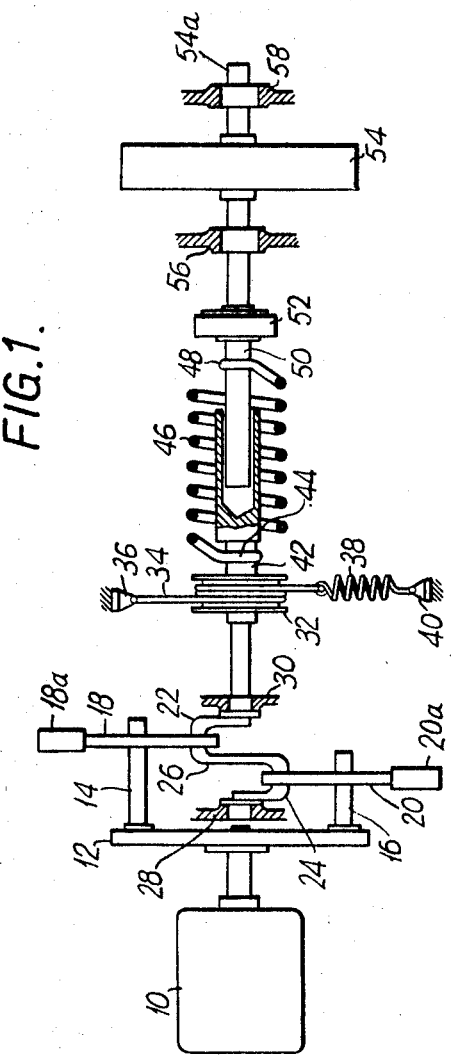

3,581,584

TORQUE CONVERTER

This invention relates to torque converters.

An object of the invention is to provide a torque converter capable of producing a very high torque of the order of 10 times the torque of the prime mover.

According to the invention a torque converter comprises a rotatable member adapted to be driven by a prime mover, the rotatable member being connected to a linkage adapted to produce oscillating or pulsating torque, which is then applied via a one-way clutch to one end of a resilient member, the other end of which is either connected directly to the load to drive it or is connected through a lost motion device in turn connected to the load.

Preferably an additional clutch is provided between the prime mover and a shaft which applies the torque to the resilient member the additional clutch being so arranged that this shaft is prevented from overspeeding relatively to the prime mover.

The linkage may, for example, embody weights and a crankshaft, and the weights may form part of the linkage or be additional weights.

The resilient member may, for example, be a torsion bar or a coil spring or a spiral spring. The spring may be a nonlinear spring such that it will produce a constant power characteristic, the spring getting progressively stiffer as it is wound.

The lost motion device may, for example, be an element having backlash, which permits about one turn of the input relatively to the output of the backlash element.

Oscillating torque is torque which is symmetrical about a zero line, but when the zero line is itself moving and the torque is oscillatory about a moving line it is referred to as pulsating torque. In the present invention when the crankshaft is rotating the torque is pulsating.

According to another aspect of the invention a torque converter comprises a rotatable member adapted to be driven by a prime mover, the rotatable member being connected through a pin and slot or other lost motion mechanism to two links pivoted to opposite throws of an independently rotatable crankshaft so that as the prime mover rotates the rotatable member the links are caused to rotate about their pivot points producing centrifugal forces on the pivot points substantially proportional to the square of the prime mover speed, the pulsating torque thus produced being applied via a one-way clutch to one end of a coil spring, the other end of which is connected to the load to drive it.

According to a feature of the invention the coil spring is adapted to be capable of having one of its ends rotated through about 360° relative to the other of its ends.

If the coil spring is not capable of having its end rotated about 360° relative to each other a lost motion device, capable of providing of the order of 300° of lost motion may be interposed between the coil spring and the load. Preferably the load is one having a large element of inertia.

The one-way clutch between the crankshaft and the spring or the freewheel may, for instance, be a conventional one-way clutch or it may be a capstan wheel fitted with a capstan wire, one end of which is rigidly connected to a stationary portion of the torque converter, and the other end of which is connected via a tail spring to a stationary portion of the torque converter.

If a capstan is used as a one-way clutch reverse rotation of the output shaft can be provided for by reversing the sense in which the capstan wire is connected. This might be done, for instance, by providing two oppositely oriented capstan wires and controlling the direction of rotation by tensioning one or other of the tail springs.

The linkage may be connected to the drive input shaft through an epicyclic gear arrangement. For example, the input shaft may be connected to a planet carrier, the crankshaft being connected to a sunwheel and pins being attached to the annular gear and engaging in slots in links in turn pivoted to opposite throws of the crankshaft. The outer ends of the links may carry weights.

In another arrangement the input shaft carries a disc on which are located spacer driving pins each pin being connected by a link to a roller, the link also carrying a weight at its outer end, the rollers bearing against an oval or elliptical cam track formed as the inner surface of a driving disc connected to an output shaft.

Torque converters, as is well shown can be used as a by pass drive e.g. in low speed engines such as bus engines.

In the accompanying drawings is illustrated one embodiment of the invention.

In the drawings:

FIG. 1 shows diagrammatically an embodiment of the invention applied as a torque converter for transferring motion from a prime mover to a flywheel;

FIG. 2 shows diagrammatically the relative positioning of parts shown in FIG. 1 at a given instant in time;

FIG. 3 and 4 are graphs of the torque pattern as a function of time at different speeds of rotation of the prime mover;

Figure 5:
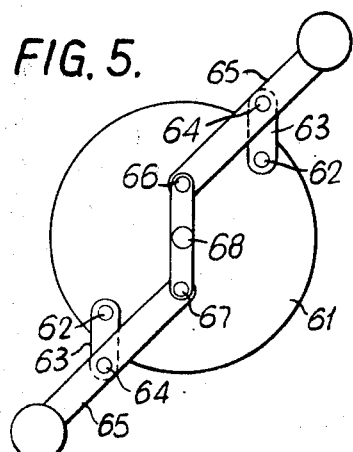
FIGS. 5 and 6 show diagrammatically an alternative form of linkage.

In FIG. 1 a prime mover 10 which may, for example, be an internal combustion engine of the type commercially used on motor vehicles, is arranged to drive a disc 12. The disc 12 could be replaced in practice by a wheel or an arm since its function is simply to carry two diametrically opposite pegs, 14 and 16. The pegs 14 and 16 are connected via links 18 and 20 to opposite throws, 22 and 24, of a crankshaft 26 independently rotatable in bearings in 28 and 30. The links 18 and 20 have weights 18a and 20a at their outer ends.

The crankshaft 26 is connected to a capstan wheel 32. Round the capstan wheel 32 is wrapped a cable 34, one end of which is attached to a fixed point 36, and the other end, through a tail spring 38, to another fixed point 40. The capstan merely acts as a one-way clutch. Application of torque in a sense to wind up the cable 34 around wheel 32 with cable movement away from the fixed point will bind the cable tightly on the wheel and stop rotation of shaft 42. This does not involve complete seizure of the overall mechanism since the prime mover can still rotate the links 18, 20 about the crankshaft throws 22, 24. Application of torque in the opposite sense does not bind the cable to the same extent since the tail spring 38 is then effective to permit cable movement. As soon as the applied torque is reversed again, the tail spring immediately returns the cable to a disposition in which it binds on the wheel. This capstan arrangement can be replaced by any conventional kind of one-way clutch.

The capstan is connected by a shaft 42 to one end 44 of a coil spring 46. The other end 48 of the coil spring 46 is connected to a shaft 50, which through a lost motion device 52, is connected to the load which is typified by a flywheel 54 supported in bearings 56 and 58. The lost motion device 52 is intended to provide at least 300° of lost motion and may, for example, be a backlash element. Any suitable lost motion device could be used in place of lost motion device 52, and this lost motion device can be dispensed with if the ends of the coil spring 44 and 48 are capable of relative rotation of 360°.

The disc 12 is shown in FIG. 2 in more detail. It rotates about a center 12A and the links 18, 20, are shown in a position which they occupy at a particular point in time. At one end of each link is a hole 19 and at the other end a slot 21. The hole 19 is engaged over throw 24 of the crankshaft 26 and the slot 21 is engaged over the peg 16.

When the disc 12 rotates the pins 14 and 16 drive the links 18 and 20 and cause them to rotate about their pivot points on the crankshaft 26. Centrifugal forces on the pivot points are produced substantially proportional to the square of the speed of the prime mover 10. The situation at a particular instant is shown in FIG. 2. At this instant centrifugal force indicated by P produces a counterclockwise torque on the crank. As the disc 12 rotates with the crank stationary, this torque reduces and becomes zero after 90° of rotation after which the torque reverses and reaches a maximum value in the clockwise direction after a further 90° rotation. Thus the two links 18 and 20 acting together produce a pulsating torque on the capstan wheel 32, as indicated in FIG. 3. For forward motion of a vehicle to be driven by the prime mover 10, say, the direction of rotation of capstan 32 is made the same as the direction of rotation of the prime mover. Under the influence of the pulsating force the capstan wheel 32 rotates, and through shaft 42 applies torque at end 44 of spring 46. The spring 46 takes up the slack in the last motion device 52 and drives the flywheel 54.

If the output speed is zero, capstan 32 will continue to move round until the torque in spring 46 is equal and opposite to the peak pulsating torque provided by the crankshaft 26, and the starting torque is therefore substantially proportional to the square of the speed of the prime mover 10. Under these circumstances the power required from the prime mover 10 is very small since it need only make good the loses in the system.

Under the influence of the drive torque the output shaft 42 will accelerate so that during the period when the capstan 32 is stationary, during the half-cycle when the crankshaft 26 is supplying reverse torque, the spring 46 will unwind an amount proportional to the speed of the output shaft relative to the speed of the rime mover 10. At slow speeds this unwinding will be insufficient to release all the torque stored in spring 46 and a pulsating unidirectional torque will be supplied to the flywheel 54. However, since the capstan 32 will now be moving during the period when the crankshaft 26 is supplied with forward torque, the period during which the spring 46 is being wound will increase relative to the period that it is unwinding, during which period capstan 32 is stationary. The torque pattern as a function of time applied to capstan 32 will therefore change as shown in FIG. 4, and with increasing speed of the output shaft 54a attached to flywheel 54, the drive half-cycle will increase progressively, relative to the clamped half-cycle during which the spring 46 is driving the load.

With sufficient increase in the speed of the output shaft 54, the spring 46 may become fully unwound during the period when the capstan 32 is stationary. The load can then coast on due to the backlash provided by the lost motion device 52. This backlash is taken up during the next drive half-cycle and the period of coasting is very brief since it is comparable with the time of one-half revolution of the prime mover 10. Ultimately the output shaft 54a will be accelerated to the speed equal to that of the prime mover and the system will synchronize somewhere in the now infinitely extended drive half-cycle. The drive from the prime mover 10 is now directly connected to the output shaft 54a and the only losses in the system are those in the capstan 32. These losses can be substantially eliminated by arranging that when synchronism is achieved the tail spring 38 in the capstan wire 34 is released.

The torque converter described above provides in "top gear" a direct drive to the output shaft with the torque amplifying mechanism inoperative to save wear and power loss.

If the spring 46 is sufficiently large so that it can safely have one of its extremities rotated through 360° relative to the other the lost motion device 52 can be omitted, but this requires a much longer spring.

Although the backlash element 52 is shown to the right of spring it may be located to the left of it.

With the constant input speed the apparatus can be designed to produce at least 6:1 torque amplification, at low output speeds. The efficiency of the system is high. Values in excess of 80percent have been achieved. Since the output torque is proportional to the square of engine speed variation of engine speed can be used to provide staring torques higher than 10 times the peak torque of the prime mover.

The system can also provide reverse rotation of the output shaft merely by reversing the sense in which the capstan wire is connected. This would be most readily done by providing two oppositely orientated capstan wires and controlling the direction of rotation by tensioning one or the other of the tail springs.

It will be appreciated that when operating in this mode synchronism can never be achieved, since the senses of rotation are opposite. When operated in this mode the crankshaft assembly adapted to produce pulsating torque can be replaced by any device adapted to produce oscillatory as distinct from pulsating torque, as, for example, a shunt excited DC machine having its armature supplied by AC or a simple crank system.

In operation at tickover speeds the torque developed, which is proportional to the square of engine speed is insufficient to overcome friction and the vehicle remains stationary. Acceleration torque is subsequently controlled by control of engine speed. At any instant during acceleration the system can be put into direct drive simply by reducing the engine speed to be equal to that of the output shaft. The torque converter can be reengaged by reacceleration of the prime mover.

At reasonably high speeds the output shaft can drive the engine if the power supply to it is removed and it will continue to drive backwards thus providing engine braking until the speed falls so far that the crank can no longer provide the friction torque of the engine.

Figure 6:
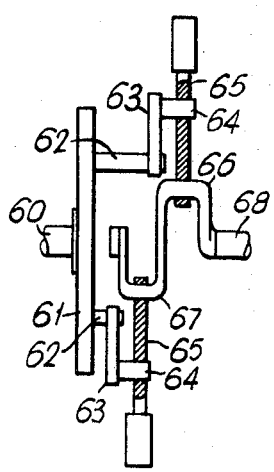

In the embodiment of the invention shown in FIGS. 5 and 6 the pin and slot mechanism is omitted from the linkage. The input shaft 60 (FIG. 6) is connected to a driving disc 61 to which are fixed diametrically opposed driving pins 62. A link 63 is pivoted to each pin 62 and each link 63 is also pivoted to a pin 64 fixed to a rod 65. The two rods 65 are connected to the opposite arms 66 and 67 of a crankshaft 68 which is the output shaft.

With this arrangement the sliding contacts of the drive pins are avoided.

Figure 7:
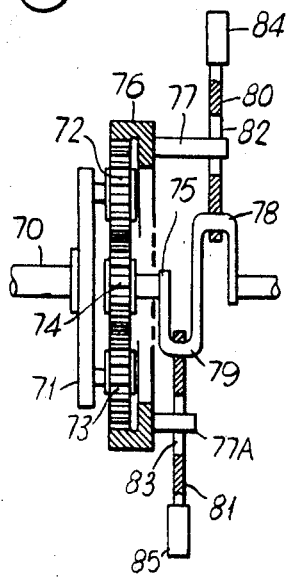
FIG. 7 shows a version of the linkage incorporating an epicyclic gearing arrangement.

In FIG. 7 an embodiment of the invention is shown employing an epicyclic gearing arrangement. The input shaft 70 is connected to a disc 71 acting as a planet carrier for planet gears 72 and 73. The planet gears 72 and 73 engage a sunwheel 74 fixed to a crankshaft 75. The planet gears 72 and 73 also engage the toothed inner periphery of an annulus 76 which carries diametrically opposite pins 77, 77A. The pins 77, 77A are connected to opposite throws 78, 79 of the crankshaft 75 by links 80 and 81. The pin 77 is connected to link 80 by a slot 82 and carries at its outer end a weight 84. The pin 77A is connected to link 81 by a slot 83 and carries at its outer end a weight 85.

Figure 8:
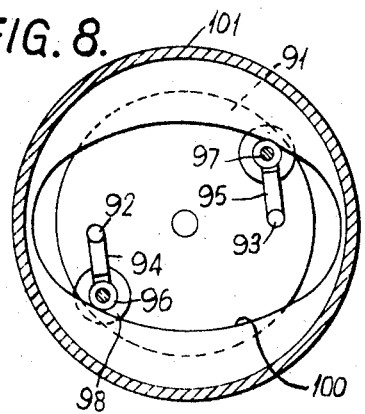
FIGS. 8 and 9 illustrate a further embodiment of the invention involving a roller and cam track drive.
Figure 9:
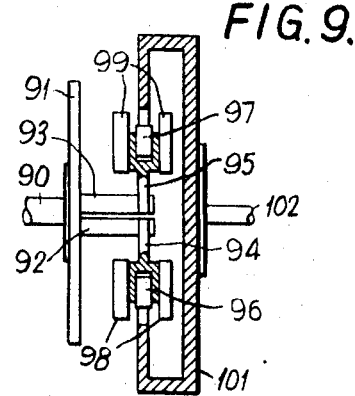

In FIGS. 8 and 9 the input shaft 90 carries a disc 91 on which are two pins 92, 93 pivoted to links 94, 95 supporting journaled rollers 96, 97 and fixed weights 98, 99. The rollers 96, 97 engage and drive an oval track 100 formed as the inner periphery of a hollow disc 101 attached to the output shaft 102. This arrangement also avoids the need for pin and slot connections, the elliptical track and rollers acting to produce the torque in the output shaft.

Figure 10:
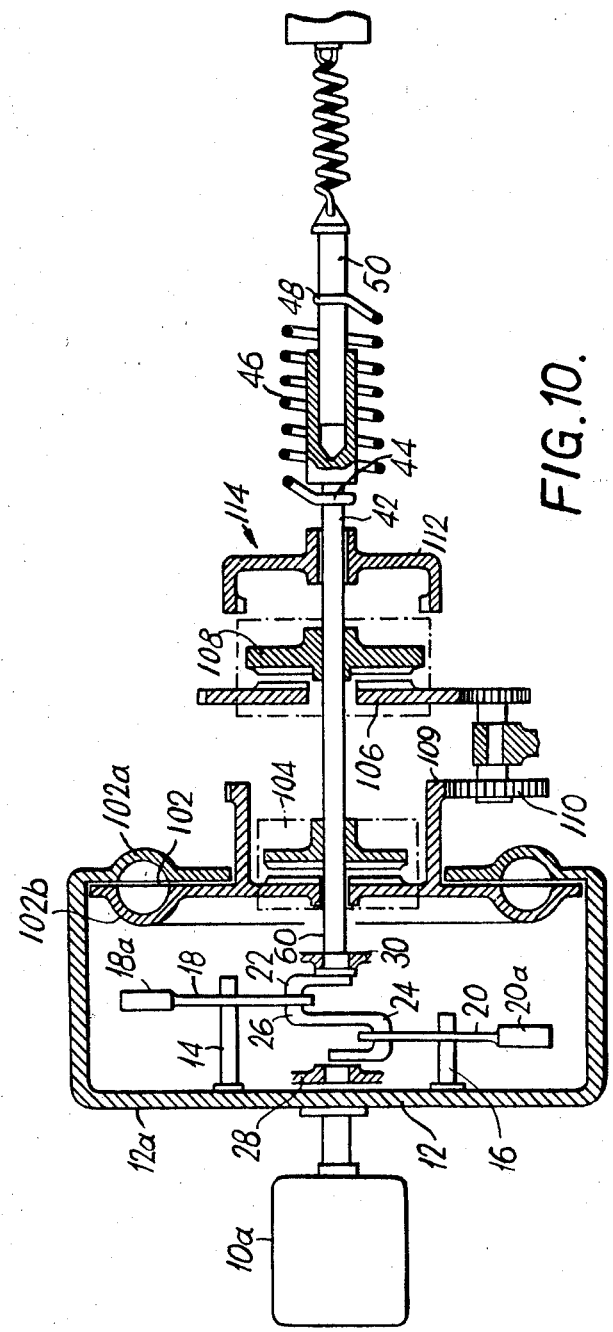
FIG. 10 illustrates yet a further embodiment of the invention involving a fluid flywheel.

In FIG. 10 is shown a further embodiment of the invention incorporating a fluid flywheel. In this arrangement the torque converter is used as a bridge between low gear and top gear. As shown in the drawing the prime mover 10a drives the outer drum 12a, the drum 12a including as part of its construction a disc 12 carrying diametrically opposed pegs 14 and 16 as before. The pegs 14 and 16 are connected via links 18 and 20 to opposite throws 22 and 24 of a crankshaft 26 independently rotatable in bearings 28 and 30. The links 18 and 20 have weights 18a and 20a at their outer ends. The crankshaft 26 is connected to a shaft 60. The drum 12a is oil-filled and contains a fluid flywheel coupling 102, the impeller 102a of which is fixed to the drum and the runner 102b is free on the shaft 60, but is linked to it by a one-way clutch 104. The clutch 104 is connected in such a sense as to prevent the shaft 60 overspeeding relatively to the runner 102b of the flywheel, thus providing shockfree transition from forward-drive to engine braking. The runner 102b drives the outer portion 106 of a second one-way clutch 108 which acts as a backstop. The drive from the runner 102b to the outer portion 106 of clutch 108 is via reduction gear 109 and 110 and the arrangement is such that the runner drives the outer gear 106 in a forward direction. The clutch 108 is so arranged as to freewheel during engine braking whereas the clutch 104 freewheels during forward drive. Additionally a normally disengaged clutch 112 is splined to the shaft 60 and may be pushed in the direction of the arrow 114, so as to lock up the clutch 108. The remainder of the apparatus to the right of clutch 112 can be as previously described the reference numerals being the same as described with reference to FIG. 1.

The operation of the apparatus is as follows:

With the engine idling the forces on crankshaft 26 are not sufficient to rotate it. The fluid flywheel 102 is slipping and the vehicle is stationary. As the engine is speeded up the design is such that torque is transmitted through the fluid flywheel 102 and the gears 109 and 110 drives the vehicle in the normal manner of an automatic gearbox working in bottom gear, the output torque being then the engine torque times the gear ratio. As the vehicle speeds up the torque converter comes into play exactly as in the previous cases except that it is backstopped by a moving, instead of a stationary, outer ring. The higher the output speed for a given engine speed, the lower will be the torque transmitted and finally the system will lock into top gear as in the previous cases. If the torque converter is used in a motor vehicle and the foot is removed from the accelerator, engine braking is obtained through one-way clutch 104 and the fluid flywheel runner. A lock-in-low facility is provided by engaging the clutch 112.

The merits of this arrangement are:

1. Takeoff from rest is much more conventional and high frequency operation of clutch 102 is avoided.
2. The overrun speed of one-way clutch 108 is reduced.
3. The maximum torque requirement need not be supplied by the inertia system. This provides greater flexibility of design and possibly reduced size.
4. Transition from forward drive to engine braking is smoothed.
5. Lock-in-low facilities are avoidable Indeed, if the clutch 112 were arranged to operate from load end of the springs instead of drive end, it would provide a conventional means of locomotion, in the event of breakages in the remainder of the equipment.

I claim:

1. A torque converter for coupling between a prime mover and a load, said converter comprising:
    a first rotatable member for drivably coupling to said prime mover,
    a second rotatable member,
    a linkage for drivably coupling said first rotatable member to said second rotatable member and for producing an oscillating or pulsating torque in said second rotatable member,
    an overspeed mechanism coupled between said first rotatable member and said second rotatable member for preventing said second member from overspeeding relative to said first member,
    a unidirectionally drivable mechanism connected to said second rotatable member, and
    a resilient member drivably coupled at one end thereof to said unidirectionally drivable mechanism and for drivably coupling at the other end thereof to said load.

2. A torque converter as in claim 1 wherein said overspeed mechanism comprises a second unidirectionally drivable mechanism.

3. A torque converter as in claim 1 wherein said resilient member comprises a spiral spring.

4. A torque converter as in claim 1 wherein said resilient member comprises a coil spring.

5. A torque converter as in claim 4 wherein said coil spring is capable of 360° relative rotational movement between its ends.

6. A torque converter as in claim 1 wherein said resilient member comprises a torsion bar.

7. A torque converter as in claim 1 wherein said resilient member has a nonlinear spring characteristic.

8. A torque converter as in claim 7 wherein said resilient member is a nonlinear spring which becomes progressively stiffer as it is wound.

9. A torque converter as in claim 1 comprising a lost-motion device having backlash and connected to one end of said resilient member.

10. A torque converter as in claim 9 wherein said lost-motion device provides approximately one turn of rotational lost motion.

11. A torque converter as in claim 9 wherein said lost-motion device provides substantially 300° of rotational lost motion.

12. A torque converter as in claim 1 wherein said linkage comprises:
    a crankshaft drivably coupled with said second rotatable member,
    a first linkage member rotatably mounted on a throw of said crankshaft, and
    a second linkage member drivably connected to said first rotatable member, and coupled to said first linkage member for rotating the same.

13. A torque converter as in claim 12 wherein said first linkage member is eccentrically weighted relative to said crankshaft throw.

14. A torque converter as in claim 1 wherein said linkage comprises an epicyclic gearing assembly including:
    a sun gear,
    a multithrow crankshaft drivably connected between said sun gear and said second rotatable member,
    linkage members rotatably mounted on respective throws of said crankshaft,
    an annular gear disposed around said sun gear and coupled to said linkage members to rotate the same, and
    planet gears engaged between said sun gear and coupled for rotation about said gun gear and coupled for rotation about said sun gear with said first rotatable member.

15. A torque converter as in claim 1 wherein said linkage comprises:
    a linkage member rotatable with said first rotatable member, and rotatable about an axis radially remote from that of said first rotatable member,
    an oval cam track connected with said second rotatable member, and
    a cam follower connected with said linkage member remoted from its axis of rotation and engaged with said cam track.

16. A torque converter as in claim 1 comprising a fluid flywheel including:
    an impeller connected to said first rotatable member, and
    a runner connected to said second rotatable member for additionally coupling said members.

17. A torque converter as in claim 16 wherein said linkage is housed within said fluid flywheel.

18. A torque converter as in claim 16 wherein one of said overspeed mechanism and said first-mentioned unidirectionally drivable mechanism is directly connected between said runner and said second rotatable member, and
    the other of said mechanisms is indirectly connected therebetween by way of intermediate gearing.

19. A torque converter for coupling between a prime mover and a load, said converter comprising:
    a first rotatable member for drivably coupling said prime mover,
    a second rotatable member,
    a linkage for drivably coupling said rotatable member to said second rotatable member and for producing an oscillating or pulsating torque in said second rotatable member,
    an overspeed mechanism comprising a unidirectionally drivable mechanism coupled between said first rotatable member and said second rotatable member for preventing said second member from overspeeding relative to said first member, a second unidirectionally drivable mechanism coupled to said second rotatable member, and a resilient member having a nonlinear spring characteristic which becomes progressively stiffer with compressive loading thereon, drivably coupled at one end thereof to said second unidirectionally drivable mechanism and for drivably coupling the other end thereof to said load.